United States Patent Office 3,707,574
Patented Dec. 26, 1972

3,707,574
METHOD FOR THE CONTINUOUS PRODUCTION OF 1,1-DICHLORETHANE
Rudolf Stephan, Ranzel, and Hermann Richtzenhain, Cologne-Sulz, Germany, assignors to Dynamit Nobel Aktiengesellschaft
No Drawing. Continuation of application Ser. No. 617,459, Feb. 21, 1967. This application June 26, 1970, Ser. No. 56,066
Claims priority, application Germany, Feb. 24, 1966, D 49,427
Int. Cl. C07c *17/08*
U.S. Cl. 260—658 R
2 Claims

ABSTRACT OF THE DISCLOSURE

A method for the continuous production of 1,1-dichlorethane by reacting vinyl chloride introduced in liquid form and dry hydrogen chloride in 1,1-dichlorethane as reaction medium in the presence of catalytic quantities of an anhydrous chloride of a trivalent metal is disclosed characterized in that the reaction is carried out in a vertical reaction zone at a temperature below about 50° C. The liquid vinyl chloride and dry hydrogen chloride are introduced at the lower end of the reaction zone. The catalyst is maintained in suspension in the lower portion of the reaction zone by regulating the rate at which the starting materials are introduced into the reaction zone. The 1,1-dichlorethane reaction product which is entirely free of suspended catalyst is removed at the top of the reaction zone.

---

The instant invention relates to a method for the continuous production of 1,1-dichlorethane. More particularly, the instant invention relates to the continuous production of 1,1-dichlorethane by reaction of vinyl chloride and dry hydrogen chloride in the presence of a trivalent metal chloride catalyst.

It is already known that 1,1-dichlorethane can be produced batchwise from vinyl chloride and dry hydrogen chloride. In the known method, the reactants are introduced in a gaseous state into a reactor in which they are reacted at temperatures of about 20 to 50° C. in the presence of a catalyst. As catalysts, there are employed metal chlorides, as for instance ferric chloride or aluminum chloride.

Metal chloride catalysts are present in the reactor, i.e., reaction zone suspended partially dissolved in an organic phase and generally in preformed 1,1-dichlorethane.

The change-over from the batch method to the continuous method was effected, for instance, according to the known methods by removing the 1,1-dichlorethane formed in the reaction from the reaction mixture by distillation. Accordingly, it was necessary to operate at reaction temperatures which were above the boiling point of the 1,1-dichlorethane. On the other hand, if one wanted to operate at temperatures below the boiling point of 1,1-dichloroethane (B.P.=57.3° C.), for instance in a mixture of liquid 1,1-dichlorethane and vinyl chloride as reaction medium, which is desirable in order to avoid the disadvantages hereinafter set out, it was necessary to carry out the reaction in a discontinuous fashion, as for example, in an autoclave. The reaction mixture then had to be worked up in a further operation.

The disadvantage of carrying out the reaction at temperatures above about 50° C. is that the 1,1-dichlorethane formed is decomposed to a considerable extent in the presence of the metal chloride catalysts, and in a subsequent reaction, is converted into high molecular compounds, resulting in a deactivating of the catalyst. Since the addition of hydrogen chloride to the vinyl chloride takes place exothermally, it is a difficult problem as proven by experience, particularly when attempting to use larger reactors and operating under high load to effectively and simply remove the heat which is produced in the reaction and thereby avoid overheating.

In accordance with the invention, it has now been found that 1,1-dichlorethane can be produced continuously in an efficient and simple manner by reaction of vinyl chloride and dry hydrogen chloride in 1,1-dichlorethane as reaction medium in the presence of catalytic quantities of an anhydrous trivalent metal chloride by effecting the reaction in a vertical reaction zone at a temperature below about 50° C., introducing liquid vinyl chloride and dry hydrogen chloride at the lower end of said reaction zone, and maintaining the catalyst in suspension in the lower part of the reaction zone by regulating the rate at which the starting materials are introduced and by removing 1,1-dichlorethane which is free of suspended catalyst from the top of the reaction zone. The 1,1-dichlorethane reaction product can thereafter be purified in the customary manner.

In accordance with the present invention, temperatures of about 15 to 35° C. are preferably employed in the reaction zone.

The advance in the art represented by the method of the invention for producing 1,1-dichlorethane wherein vinyl chloride in liquid form is continuously introduced into a tubular vertical reactor, resides in the fact that the heat of evaporation of the vinyl chloride is utilized for internal cooling. In this way the amount of heat liberated in the reaction is considerably reduced, so that the reactor, for the same cooling surface, can be loaded up to about 25% more than heretofore possible.

The catalyst, as for instance ferric chloride, or aluminum chloride, had to be continuously supplemented in the continuous methods for producing 1,1-dichlorethane as previously practiced, since it was suspended in 1,1-dichlorethane, it was continuously removed with the latter from the reactor.

Another advantage of the method of the invention is that it is also possible to introduce the small quantities of fresh catalyst required as make-up catalyst together with the liquid vinyl chloride into the reactor. As is well known, continuous feeding of meausred larger quantities of a solid into a liquid reactor generally involves a greater technical expenditure than does the feeding of a measured quantity of a liquid or of a finely divided suspension having a low solids content.

Although when using liquid vinyl chloride the two reactants, as in the gas-phase process, cannot be mixed to form a homogeneous phase before introduction thereof into the reactor, it is nevertheless possible in accordance with the present invention to react the two reaction components substantially completely, the 1,1-dichlorethane produced being obtained in a state of high purity.

If the vinyl chloride and the hydrogen chloride are reacted advantageously in equimolar quantities, the 1,1-dichlorethane discharged from the reactor still contains only about 2% vinyl chloride. If a slight excess of hydrogen chloride is employed in the reaction, the conversion of the vinyl chloride is increased even further.

Liquid vinyl chloride is pumped continuously into a tubular reactor provided with a cooling jacket and a thermometer connection. The liquid vinyl chloride is introduced above a gas-dispersing plate and dissolves in the 1,1-dichlorethane already present in the reactor. Dry hydrogen chloride is introduced from below through the gas distribution plate into the reactor and bubbles through the zone containing the freshly introduced vinyl chloride and the zone containing the catalyst. The suspended partially dissolved catalyst, which is for instance aluminum chloride or ferric chloride, and which is already present in the reaction mixture, moves due to the resultant turbulence, into the reaction zone which lies directly above the gas-distributing plate. The reaction zone is also a zone of strong turbulence, the latter being reduced proportionally as vinyl chloride and hydrogen chloride react to form 1,1-dichlorethane. If the conditions of reaction are maintained so that the rate of sedimentation of the ferric chloride or aluminum chloride catalyst is greater than the velocity of flow of the resultant 1,1-dichlorethane in the reactor, the eddied catalyst drops further and further downwardly into the zone of turbulence and is therefore not removed from the reactor. As a result, the 1,1-dichlorethane discharged at the top of the reactor contains only small quantities of dissolved ferric chloride, or aluminum chloride catalyst. The process of the invention therefore makes it possible to produce 1,1-dichloroethane continuously from liquid vinyl chloride and gaseous hydrogen chloride with only the smallest consumption of catalyst. The loss due to the solubility of the catalyst, as for instance ferric chloride, in 1,1-dichloroethane can be compensated for by feeding a corresponding amount of catalyst suspended in liquid vinyl chloride into the reactor above the gas-dispersing plate, or alternatively by introducing the catalyst at the top of the reactor so that it drops downwardly into the reaction mixture.

From the following comparative example, it can be seen to what extent the capacity of a continuously operating tubular reactor can be increased when it is charged on the one hand with liquid vinyl chloride and on the other hand with gaseous vinyl chloride and if reaction temperature is not permitted to exceed 25° C.

EXAMPLE

(1) Method of the invention

A reactor such as described above consisting of a vertical glass tube having a diameter of 3 cm. and a height of 2 m., and whose temperature was maintained in the cooling jacket during the reaction at 18° C., was filled with 1,1-dichlorethane. Following the addition of 50 g. of anhydrous ferric chloride, 620 g. of liquid vinyl chloride per hour were introduced above the gas-dispersing plate and 360 g. of dry hydrogen chloride per hour were introduced below the gas-dispersing plate. Using these rates of introduction of reaction components, no turbulence was observed at a point only 50 cm. above the gas-distribution plate. The reaction product was removed continuously from the top of the reactor. With this loading, a temperature of 25° C. established itself in the reactor. Suspended ferric chloride was not removed. Under consideration of the fact that the reaction was complete at a point 50 cm. above the gas-distribution plate, there resulted a space-time yield of 2700 g. of 1,1-dichlorethane per hour per liter of reaction space.

(2) Comparison test

If the same procedure is followed as in (1) using gaseous vinyl chloride, the desired temperature of 25° C. can only be maintained if the reactor is charged per hour with 470 g. gaseous vinyl chloride and
270 g. dry hydrogen chloride.

This, however, results in a reduction in the output of the reactor of about 25%. The reaction yield, therefore, was 25% less than the yield obtained by following the method of the invention, i.e., the yield of Example 1 was about 33% greater than the yield of Example 2.

We claim:
1. In a method of porducing 1,1-dichlorethane by reacting vinyl chloride and hydrogen chloride in liquid 1,1-dichlorethane as a reaction medium and in the presence of a solid, anhydrous, finely-divided aluminum chloride or ferric chloride catalyst, the improvement comprising maintaining said catalyst as a suspension and liquid 1,1-dichlorethane in a tubular vertical reaction chamber above a gas distributing member and at reaction temperature below 50° C., introducing liquid vinyl chloride into a suspended, turbulent portion of said suspension lying directly above said gas distributing member, introducing dry, hydrogen chloride gas below said gas distributing member and passing the same upwardly therethrough into said portion, removing 1,1-dichlorethane product substantially free of suspended catalyst from the top of said reaction zone above the level of said suspension and controlling the rates of feed and product withdrawal to maintain said catalyst in said portion of said suspension suspended and turbulent.

2. The process of claim 1 wherein said reaction temperature is in the range of 15 to 35° C. and said vinyl chloride and hydrogen chloride are introduced such that said hydrogen chloride is in slight excess.

References Cited

UNITED STATES PATENTS

| 2,007,144 | 7/1935 | Nutting et al. | 260—658 R |
| 2,174,737 | 10/1939 | Coleman et al. | 260—658 R |
| 3,012,080 | 12/1961 | Bergeron | 260—658 R |
| 3,344,197 | 9/1967 | Reiche et al. | 260—658 R |

FOREIGN PATENTS

| 702,594 | 1/1965 | Canada | 260—658 R |

LEON ZITVER, Primary Examiner

J. A. BOSKA, Assistant Examiner